United States Patent [19]
Walch et al.

[11] 4,317,021
[45] Feb. 23, 1982

[54] LASER CUTTING APPARATUS FOR NUCLEAR CORE FUEL SUBASSEMBLY

[75] Inventors: Allan P. Walch, Manchester; Antonio B. Caruolo, Vernon, both of Conn.

[73] Assignee: The United States of America as represented by the United States Department of Energy, Washington, D.C.

[21] Appl. No.: 123,861

[22] Filed: Feb. 22, 1980

[51] Int. Cl.³ .............................................. B23K 27/00
[52] U.S. Cl. ..................... 219/121 LG; 219/121 LQ; 219/121 LY
[58] Field of Search .... 219/121 L, 121 LM, 121 LA, 219/121 LC, 121 LG, 121 LH, 121 LN, 121 LJ, 121 LY, 121 LU, 121 LV, 121 LW, 121 LX, 121 EC, 124.1, 124.22, 124.31; 83/360, 364, 368; 266/57, 60; 350/6.5, 299; 346/76 L; 318/577, 578, 640

[56] References Cited

U.S. PATENT DOCUMENTS

| | | | |
|---|---|---|---|
| 2,384,128 | 9/1945 | Nation | 266/57 |
| 2,404,383 | 7/1946 | Kornblutt | 219/124.22 |
| 2,440,696 | 5/1948 | Patterson | 219/124.22 |
| 3,171,012 | 2/1965 | Morehead | 266/60 X |
| 3,204,081 | 8/1965 | Iceland | 219/124.1 |
| 3,736,402 | 5/1973 | Mefferd et al. | 219/121 LG |
| 3,764,775 | 10/1973 | Hasslinger et al. | 219/121 LG |
| 3,790,144 | 2/1974 | Waldron | 266/57 |
| 3,986,767 | 10/1976 | Rexer et al. | 219/121 LV X |
| 4,000,391 | 12/1976 | Yeo | 219/121 LG |
| 4,040,557 | 8/1977 | Heverly | 266/57 X |
| 4,088,890 | 5/1978 | Waters | 219/121 LX X |
| 4,110,594 | 8/1978 | May | 219/121 LY |

FOREIGN PATENT DOCUMENTS 1558595  1/1980  United Kingdom ........ 219/121 LG

*Primary Examiner*—C. L. Albritton
*Attorney, Agent, or Firm*—David E. Breeden; Stephen D. Hamel; Richard G. Besha

[57] ABSTRACT

The object of the invention is to provide a system and apparatus which employs laser cutting to disassemble a nuclear core fuel subassembly.

The apparatus includes a gantry frame (C) which straddles the core fuel subassembly (14), an x-carriage (22) travelling longitudinally above the frame which carries a focus head assembly (D) having a vertically moving carriage (46) and a laterally moving carriage (52), a system of laser beam transferring and focusing mirrors carried by the x-carriage and focusing head assembly, and a shroud follower (F) and longitudinal follower (G) for following the shape of shroud (14) to maintain a beam focal point (44) fixed upon the shroud surface for accurate cutting.

17 Claims, 11 Drawing Figures

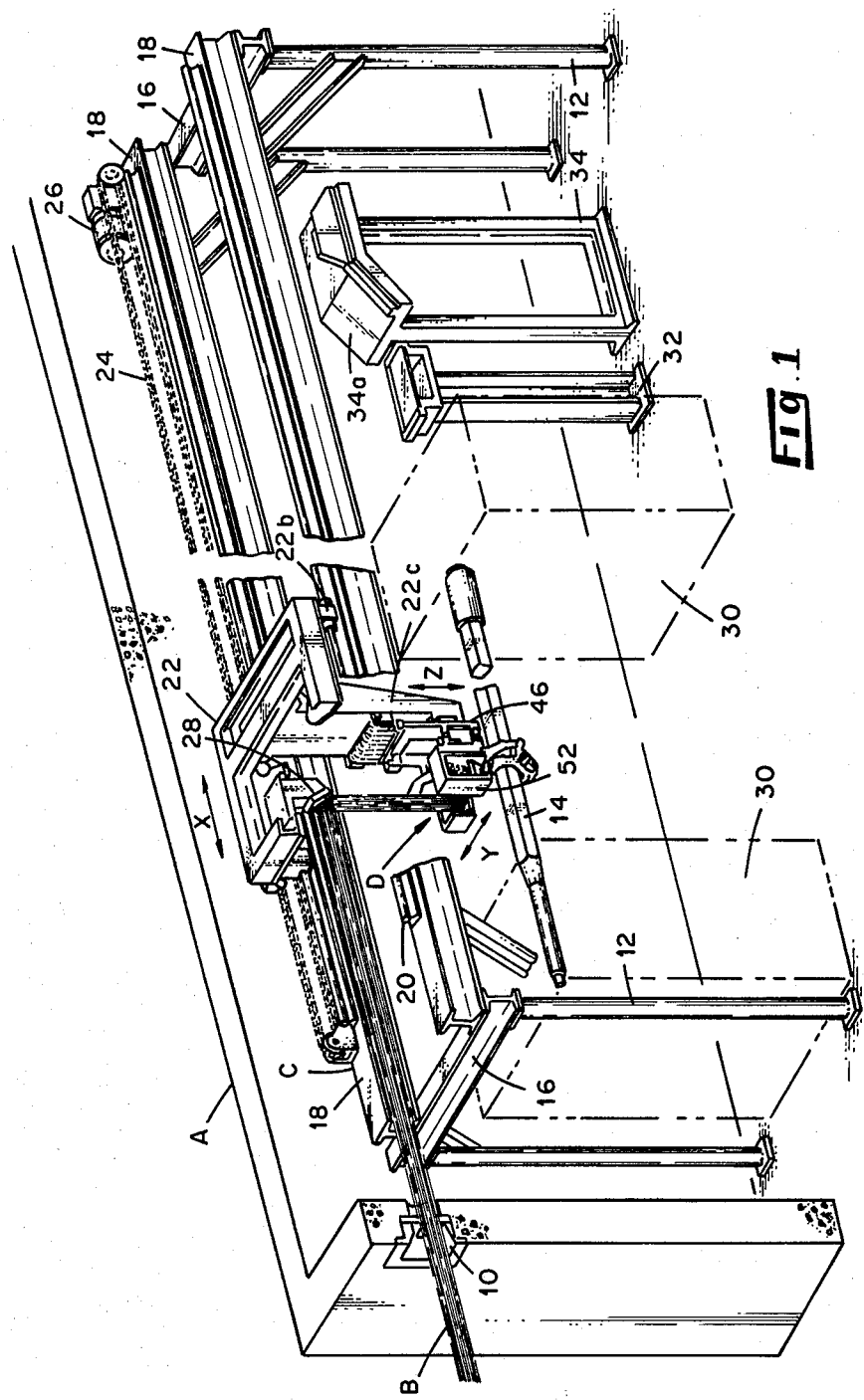

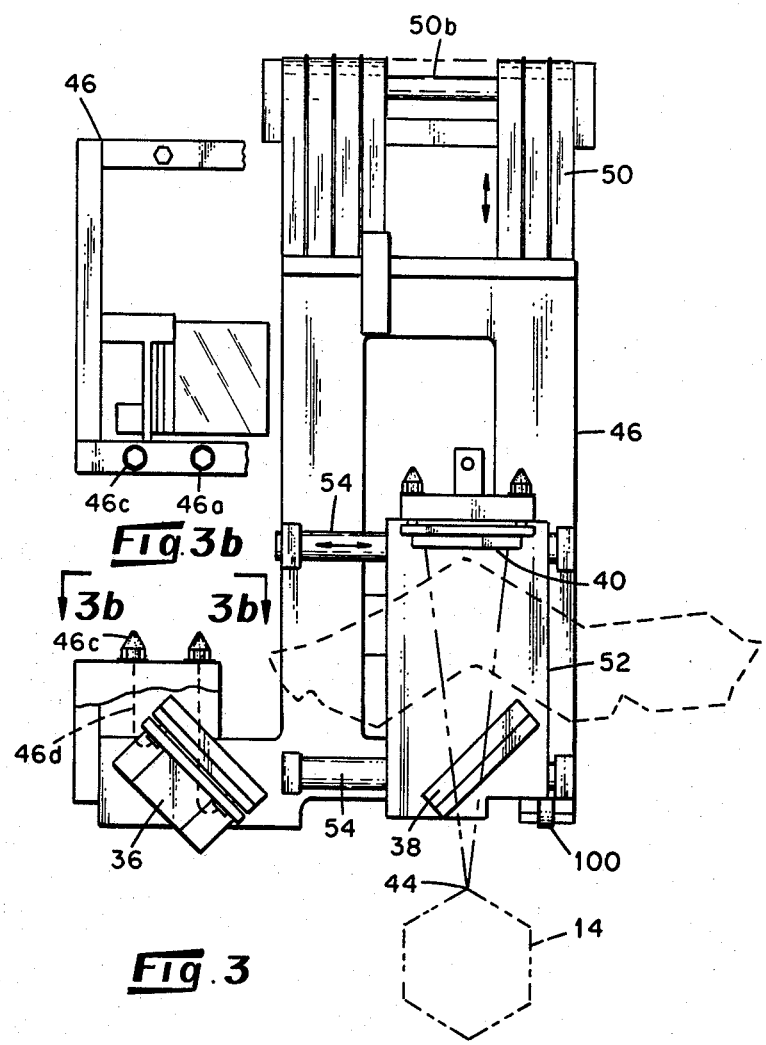

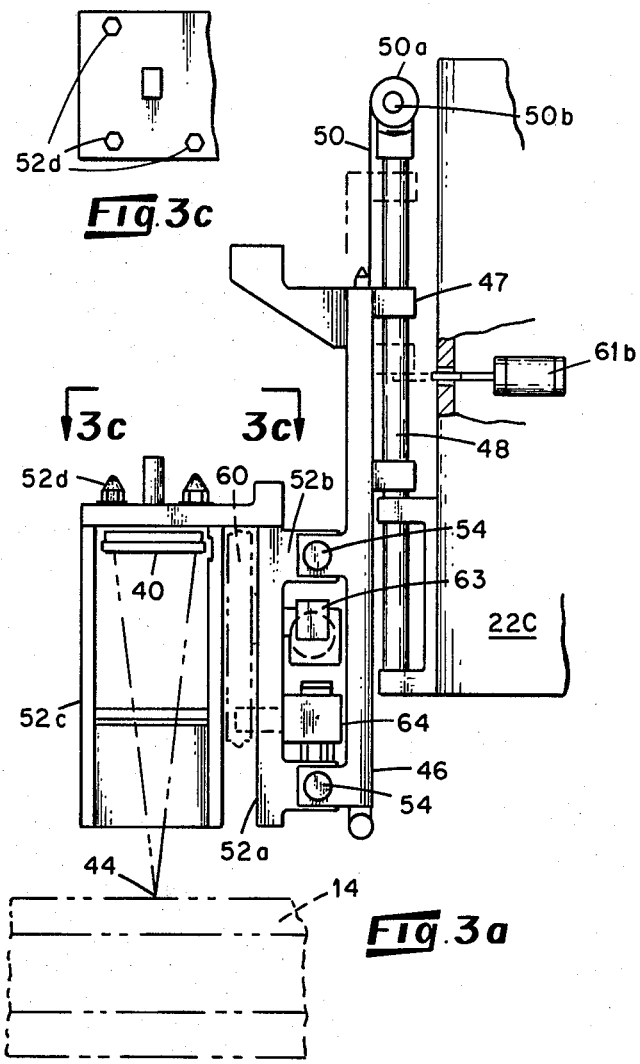

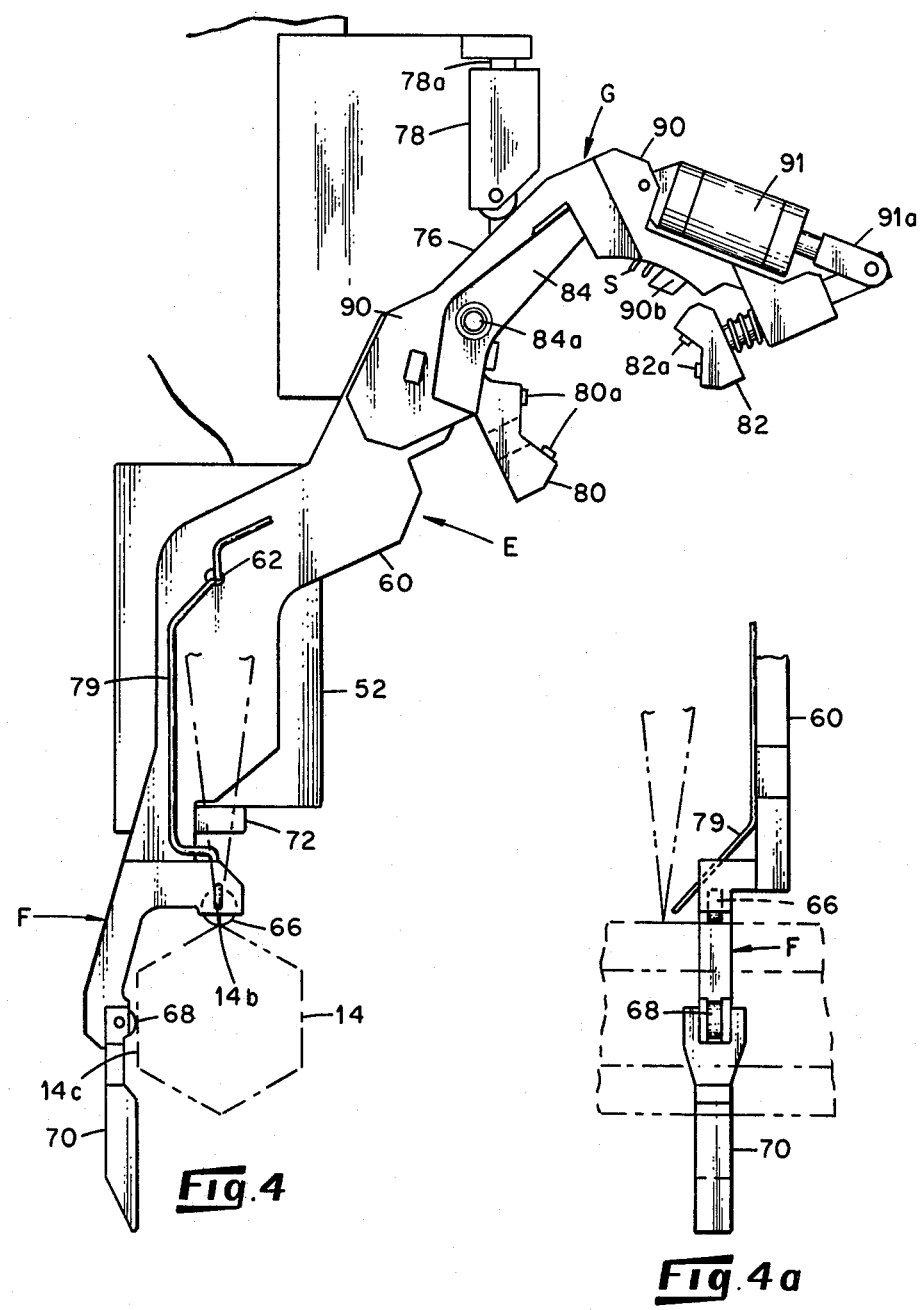

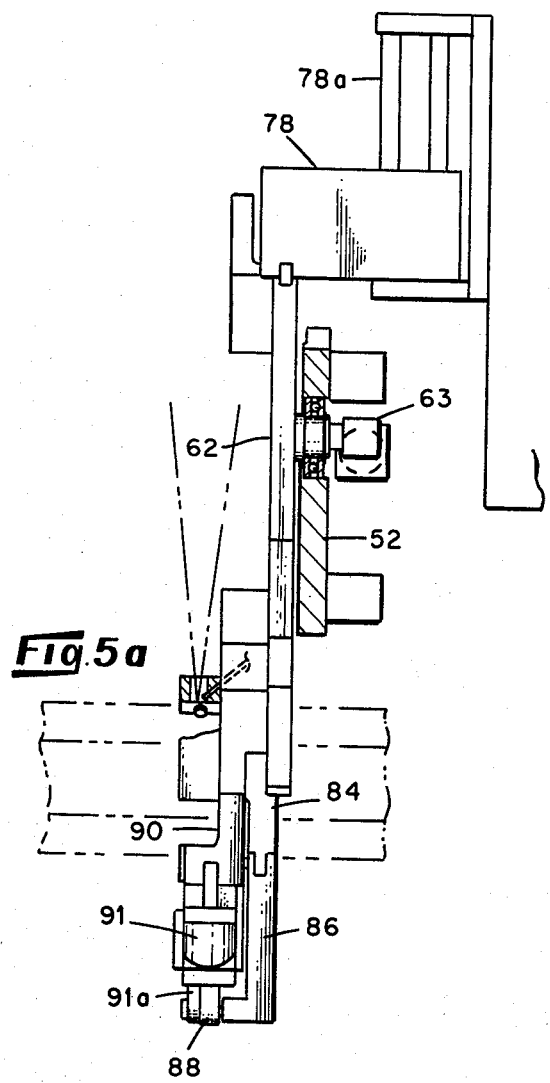

LASER CUTTING APPARATUS FOR NUCLEAR CORE FUEL SUBASSEMBLY

This invention was made as a result of a contract with the U.S. Department of Energy.

BACKGROUND OF THE INVENTION

Much attention has been given to the development of equipment and processes to recycle fuel from fast breeder reactors and other nuclear fuel cycles. Reprocessing the fissionable material contained in irradiated core fuel subassemblies includes removing the outer metal shroud from the fuel rods and shearing the fuel rods as a bundle into short lengths. This facilitates chemical leaching of the fissionable material on the remaining metallic waste.

A typical fast breeder reactor core fuel subassembly consists of a plurality of fuel rods containing the fissionable material. Each rod is wrapped with a spacer wire and arranged into a rod bundle which is then enclosed in a hexagonal shroud. Typically, 217 of such fuel rods are bundled together with each fuel rod being approximately 6 millimeters in diameter and wrapped with a 1.5 millimeter diameter spacer wire. A typical core fuel subassembly is 426.72 centimeters in length and 11.62 centimeters in diameter. The wall thickness which has to be cut is approximately 3.448 millimeters.

Work has been underway in the development of laser cutting concepts for disassembling such nuclear fuel cores which has considered use of pulsed and low powered carbon dioxide lasers as well as high powered carbon dioxide lasers. However, the problem arises that the disassembling of the fuel rod assembly requires making a circumferential cut at one end of the shroud, a longitudinal cut to the other end of the shroud, and then a second circumferential cut. Much care must be taken in the accuracy of the cutting since the fuel rods within the shroud often become warped and are forced into direct contact with the shroud in random regions. The problem arises then of cutting the nuclear fuel rod shroud without puncturing the cladding of the interior fuel rods.

The cutting system must also be capable of reliable remote operation and maintenance due to performance in a gamma-radiation environment with possible fuel rod temperatures in the range of 260° to 520° C. The laser can be located outside the cell in which the cutting system and fuel core rod are enclosed.

SUMMARY OF THE INVENTION

It has been found according to the invention that apparatus can be had for cutting a shroud of a nuclear core fuel rod subassembly by means of a laser beam by utilizing a hot cell environment in which a gantry framework straddles the core fuel subassembly and a focus head assembly carried for movement along the gantry in the longitudinal direction includes transferring and focusing mirrors and a mechanical follower assembly which moves in the vertical and lateral directions to automatically compensate for variations in the shape and configuration of the individual fuel rod subassemblies and maintain the focal point of the laser beam fixed upon the shroud surface for accurate cutting.

Accordingly, an important object of the present invention is to provide laser cutting apparatus for cutting the metal shroud of a nuclear core fuel subassembly.

Another important object of the present invention is to provide laser cutting apparatus wherein the laser is located outside of the cell in which the cutting takes place and the cutting can be automated by suitable indexing of laser beam transferring and focusing mirrors.

Another important object of the present invention is the provision of laser cutting apparatus for cutting the shroud of a nuclear fuel core assembly in a remote cell location in which the components of the apparatus can be relatively small, easy to maintain, and tolerant of the radioactive and corrosive environment in the cell.

Still another important object of the present invention is to provide a laser cutting system and apparatus for cutting the metal shroud of a nuclear core fuel subassembly wherein the cutting is accurately controlled to cut through the shroud without puncturing the cladding of individual fuel rods contained therein.

Yet another object of the present invention is to provide laser cutting apparatus for cutting a shroud of a core fuel subassembly in which the laser beam is focused and guided onto the shroud surface in a manner accounting for variations in bow and twist in each individual subassembly.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating apparatus for cutting a shroud of a core fuel subassembly utilizing a laser beam according to the invention;

FIG. 3 is a front elevational view of part of the focus head assembly illustrated in FIG. 2;

FIG. 3a is a side elevational view of the forcus head assembly illustrated in FIG. 3;

FIG. 3b is a top plan view taken in the direction of line 3b in FIG. 3;

FIG. 3c is a top plan view taken in the direction of line 3c of FIG. 3a;

FIG. 4 is an elevational view of a shroud follower assembly constructed according to the invention with the circumferential shroud follower assembly being in contact with the shroud;

FIG. 4a is a side elevational view of the shroud follower assembly of FIG. 4 illustrating the circumferential follower assembly engaging the shroud;

FIG. 5a is a side elevational view illustrating the shroud follower assembly according to the invention with the longitudinal shroud follower engaging the shroud.

DESCRIPTION OF A PREFERRED EMBODIMENT

Figure 1A:
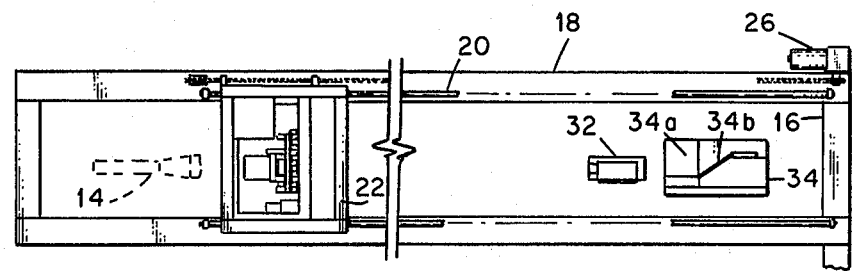
FIG. 1a is a top plan view of the apparatus shown in FIG. 1.
Figure 2:
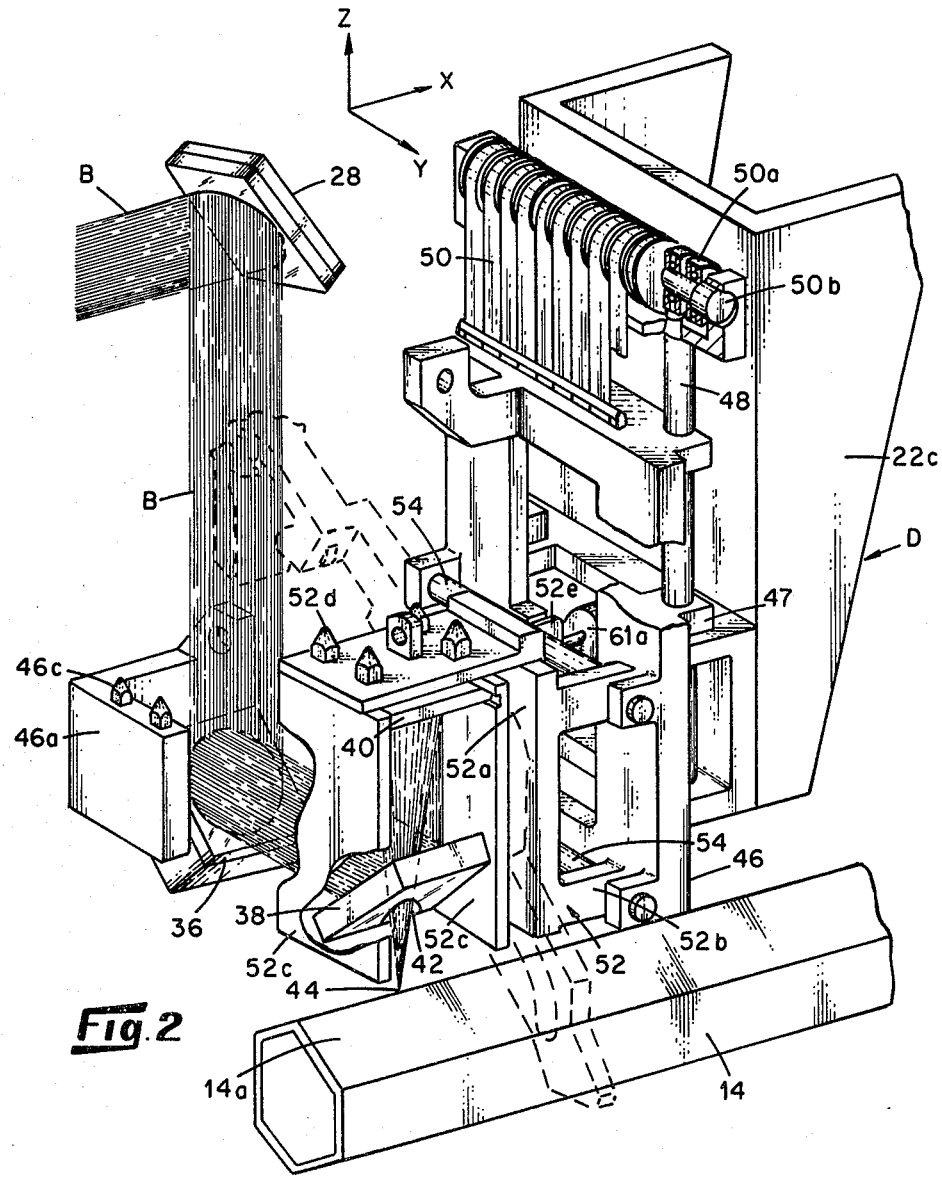
FIG. 2 is a perspective view of a focus head assembly constructed according to the invention for focusing a laser beam upon a shroud of a core fuel subassembly according to the invention.
Figure 5:
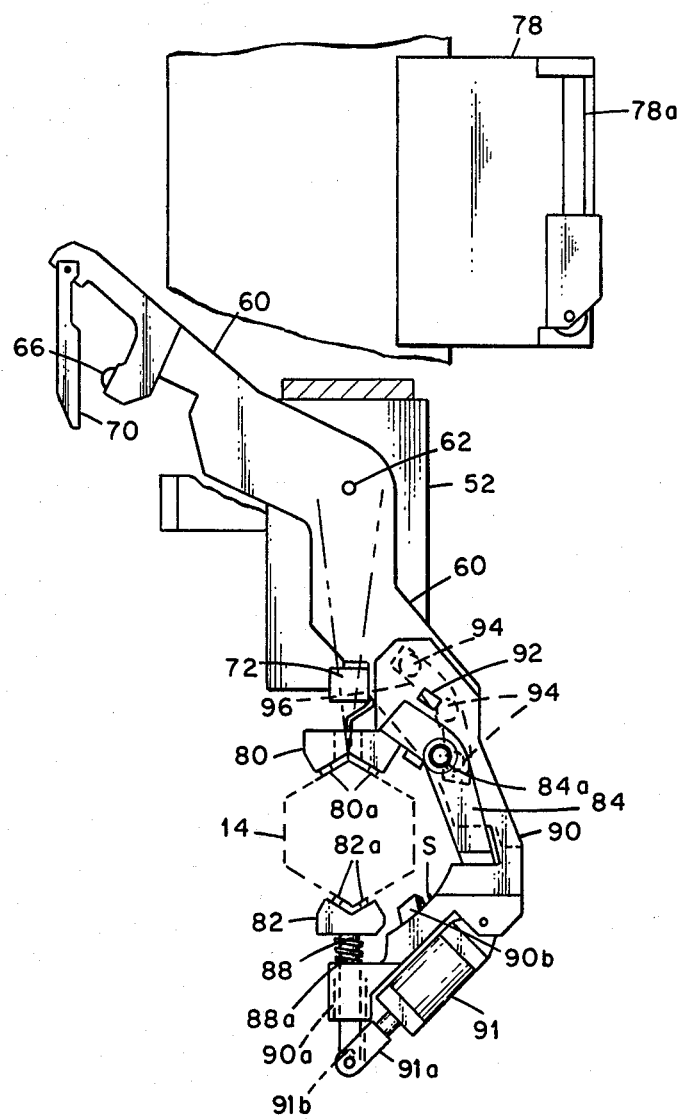
FIG. 5 is an elevational view illustrating the shroud follower assembly according to the invention with the longitudinal shroud follower assembly engaging the shroud.

The invention relates to a laser cutting system and apparatus for cutting an outer shroud of a spent nuclear core fuel subassembly for reprocessing. Any suitable laser may be utilized in the cutting process and one particularly suitable laser is a two multi-kilowatt carbon dioxide laser equipped with unstable resonator optics and a gas-jet assist to help remove vapors and molten material from the cut formed at the beam impingment point. In particular, the invention is directed to apparatus for use in a hot cell environment remote from the laser itself for focusing the laser beam and making cuts at desired locations on the metal shroud surface. Since the laser forms no part of the invention herein, the details of such are omitted and only the focusing and cutting apparatus and system will be discussed in detail herein.

As illustrated in the drawings, the apparatus includes an insulated hot cell A in which the apparatus and the nuclear core fuel subassembly are located. The cell A includes a cell window 10 through which a laser beam B is directed.

Inside the cell A, a gantry assembly C includes a framework erected on side supports 12 for spanning an area in which the nuclear core fuel subassembly 14 is supported. The framework includes lateral supports 16 bridging side supports 12 and longitudinal I-beam members 18 extending in spaced parallel relationship between spaced lateral end supports 16. Each I-beam 18 carries a precision roundway 20 upon which an X-carriage 22 is mounted for travel in the longitudinal (x) direction. Any suitable means may be provided for driving the x-carriage 22 along the roundway 20 such as a chain drive 24 and suitable stepping motor and gear box combination 26. In this manner, the movement of carriage 22 in the longitudinal direction may be done in a precision manner to position the apparatus for cutting. Carried on the carriage 22 is a turning mirror 28 which turns the laser beam B vertically. The nuclear fuel subassembly 14 may be supported between suitable supports shown schematically at 30 below the gantry framework in such a manner that the core fuel subassembly may be rotated during circumferential cutting. A calibration station 32 and a rest station 34 are provided for the travel of the carriage 22 for purposes that will be hereinafter explained.

Carriage 22 includes a rectangular frame having legs 22a which carry suitable bearings 22b which slide along roundways 20. A vertically depending support leg 22c is integrally attached with carriage frame 22 in any suitable manner.

A focus head assembly, designated generally as D, is carried by means of x-carriage 22 in any suitable manner. The focus head assembly includes three mirrors which direct and focus laser beam B onto shroud surface 14a. As the unfocused beam enters the focus head, it is turned horizontally by a Y-motion flat turning mirror 38 which directs the beam upwards onto a spherical focusing mirror 40. The focusing mirror is positioned to direct the beam B through an opening 42 in the turning mirror 38 directly onto the shroud surface at a beam focal point 44.

A second, vertically movable carriage means 46 moves in the z direction as illustrated. The z-carriage 46 is carried by x-carriage 22 by means of the depending support structure 22c. Precision ground roundways 48 are carried on support structure 22c along which the z-carriage 46 slides by means of sleeve bearings 47. To minimize the downward gravity force of the focus head assembly as the assembly follows the core fuel shroud 14, a series of constant force springs 50 is attached between the top of the roundways 48 and the top of carriage 46 by any suitable means such as illustrated. Each spring is wound upon a bearing 50a which turns about shaft 50b carried by support 22c. These springs effectively perform the same function as a counterweight.

Turning mirror 36 is carried on the z-carriage by means of U-shaped bracket arm 46a integral with carriage 46. Mirror 36 is rotatably journaled in the U-shaped arm 46a and aligned in such a manner that during lateral and vertical movements, laser beam B is always positioned correctly on the mirror. Alignment may be had by any suitable actuator as required for focused cutting operations.

Carried by z-carriage 46 is a third y-carriage means 52 which moves laterally on roundways 54 carried on z-carriage 46. The y-carriage 52 includes a bracket 52a having four legs 52b with openings formed therein which slide on roundways 54. Focusing mirror 40 is attached to a top horizontal arm of bracket 52c and rotatably journaled therein for alignment as required for cutting operation.

The turning mirror 36 is mounted and aligned in arm bracket 46a in such a manner that during movement in the y and z directions the laser beam B is positioned correctly on the turning mirror 38. Alignment of turning mirror 36 and spherical focusing mirror 40 is accomplished by turning the adjustment screws 46c and 52d on the top surface of the brackets 46a and 52c, respectively. Referring to FIGS. 3 through 3c, adjusting screws 52d are threaded into the back plate of mirror 40. Rotating of either screw 52d adjusts the mirror about an axis through the remaining screws. The same arrangement and adjustment may be had by means of screws 46c except that connection between the screws 46c and the mirror back plate is had by flexible cables 46d since adjustment need be had from the top due to access requirements. Only two adjusting screws are utilized in connection with a third nonadjustable screw connection about which the mirror pivots, the three screws being arranged as screws 52d. The turning mirror 38 is fixed and aligned at initial assembly and is carried adjacent the bottom of bracket 52c.

Referring now to FIG. 4, means for guiding the focus assembly D is illustrated as including a shroud follower assembly, designated generally as E, comprising a circumferential shroud follower F and a longitudinal shroud follower G. The two mechanical follower assemblies F and G are designed to move the focus head assembly D in appropriate lateral and vertical directions to maintain the focal point 44 of the laser beam at the correct location during cutting. The circumferential follower F and longitudinal follower G are connected together through a common connecting arm 60, which, in turn, is attached to the y-carriage 52 at a rotary pivot point 62. Movement resulting from the forces exerted on the follower assemblies during tracking is transmitted to either the y-carriage or z-carriage of the focus head assembly D through pivot point 62. The movement thus causes the appropriate carriage to slide on roundways 54 or 48 to adjust and maintain laser beam B at the desired focal point during cutting. Rotation of the connecting arm 60 by a conventional pneumatic rotary actuator 63 brings either follower assembly F or G into position. A pneumatic or other suitable lock 64 may be provided to hold the follower assembly in a horizontal neutral position when desired. The pneumatic actuator and locks may be remotely controlled in a conventional manner.

The circumferential follower F is attached to the left end of the connecting arm 60 and has two rollers 66 and 68 which contact the top and left side of the shroud surface 14 when brought into position. A horizontal locating guide 70 is pivotably attached at roller 68.

Prior to operation, z-carriage 22 is at the rest station 34 and the follower connecting arm 60 is in its neutral position and locked. The y and z focus head motions are locked by means of conventional pneumatic actuators 61a and 61b, respectively, and the fuel core assembly 14 is locked in place with one corner 14b oriented up.

The x-carriage moves into position to make the initial circumferential cut. The connecting arm 60 is unlocked and rotated counterclockwise until it contacts a mechanical stop 72 on the y-carriage. The rotary pneumatic actuator 63 remains energized during the circumferential cut cycle to lock the connecting arm 60 in position. At the same time, an inclined plane surface 76 on the right side of the connecting arms lifts a sliding weight 78 vertically. The Y-motion pneumatic lock 61b is released and y-carriage 52 is driven to the right by the gravity force of the sliding weight which slides on a post 78a carried from x-carriage 22. The sliding weight pushes on the 45 degree inclined surface 76 to force the y-carriage to the right. The y-carriage continues until either the horizontal locating guide 70 or the side roller 68 contacts the left flat surface 14c of the shroud. Once contact has been made, the z-carriage pneumatic lock is released and the sliding weight drives the focus head assembly vertically until the top roller 66 impacts the top hex point 14b. The circumferential cut now is made by turning on the laser and gas-jet assist 79 and rotating fuel core subassembly 14 by 360°. The side and top rollers are kept in contact with the shroud surface during rotations by force exerted by sliding weight 78. After completion of the circumferential cut, suitable means may be provided for locking the y and z carriages to maintain the location of the beam impingement point 44.

The longitudinal follower G is attached to the right end of the connecting arm 60 and consists of top and bottom roller assemblies 80 and 82 mechanically tied together. Each roller assembly includes a pair of rollers 80a and 82a which are positioned to follow the shroud surface on either side of the hex points. The upper and lower assemblies are mechanically connected by means of an upper linkage 84 and lower linkage 86.

The bottom roller assembly 82 includes a spring located plunger 88 slidably received in a lower bore 90a of follower support arm 90 and is connected to a pneumatic actuator 91 and lower linkage 86. The connection is slotted at 91b to allow vertical motion of the bottom roller assembly 82 to compensate for changes in the shroud width during longitudinal cutting.

The follower assembly keeps the beam focal point 44 positioned properly on the shroud surface within expected core fuel subassembly tolerances of a two-degree twist and a 10 cm bow.

To open the roller assemblies 80 and 82 for initial positioning and removal, the pneumatic actuator 91 is energized by conventional remote means resulting in a downward force on the bottom roller assembly 82. At the same time, the lower linkage 86 pulls on the bottom of the upper linkage 84 causing the upper linkage to rotate about a pivot point 84a thus raising the upper roller assembly 80. The travel during opening is limited by the upper linkage 84 coming in contact with an open travel stop 92. To close the roller assembly for contact with the shroud surface, the pneumatic actuator 91 is de-energized and the force is exerted by spring S and the upper linkage frame to bring the roller assemblies into position. Spring S is connected between projection 90b affixed to follower support arm 90 and upper linkage 84 and is compressed when the roller assembly is open.

To maintain the laser beam position during cutting as the shroud surface twists, the roller assemblies follow the surface change through the mechanical connection between the follower support arm 90 and the connecting arm 60 which is designed to allow angular movement between the two arms. The mechanical connection includes three rollers 94, which ride in a slot 96 formed in the connecting arm 60. The rollers are positioned such that they follow a center of rotation about the beam impingement point 44 on shroud 14. An angular change in the follower support arm 90 results in a force on the connecting arm 60 which is translated in appropriate y and z carriage motions through the connecting arm pivot point 62.

Operation

At the start of a typical cutting sequence, the focus head is initially at the rest station 34. As x-carriage 22 is driven toward the rest station after a previous operation, a roller 100 on the bottom of focus head assembly D engages a vertically inclined surface 34a to move and set the z-carriage to the zero position. The y-carriage is set to zero by engagement with inclined surface 34b. The y and z carriages are then locked in their reference or zero position. In the zero position the y-carriage 52 is at the extreme left as viewed in FIG. 3, and the z-carriage 46 at the highest position on their respective roundways 54 and 48. Z-carriage 46 is locked in this position by means of pneumatic lock 61b in the dotted line position of FIG. 3a. The y-carriage 52 is locked by means of forked free end (not shown) of the pneumatic plunger of device 61a which engages around a flange 52e carried on the y-carriage. The shroud follower assembly is locked in its neutral position and a test sample is in place. Left and right are defined from the vantage point given by a view of the system as in FIG. 1.

For a sample cut, the x-carriage and focus head assembly D are driven to the left until positioned over the left side of the test sample. Connecting arm 60 is unlocked and the circumferential cutting assembly F is swung into position to determine the beam impingement point and a sample cut is made. The follower assembly arm 60 is returned to the neutral position and locked. The focus head D is driven to the right onto the rest station 34 to again establish the y and z zero carriage positions. Then the y and x carriage positions are locked.

To make the circumferential cut on the left end the focus head is driven to the left until positioned over the lower circumferential cut area of the core fuel shroud 14 and the circumferential follower assembly F is swung into position. With the laser on, the core fuel subassembly A is rotated 360° and the laser cut is made. The laser is then turned off. The y and z carriages are then locked. To make a longitudinal cut, the longitudinal follower assembly G is swung into position and the laser is turned on. The focus head assembly D is then driven to the right and the laser cut is made. After the laser is turned off, the y and z carriages are locked. The final right circumferential cut is accomplished by repeating the left sequence, however, the total process is completed when the focus head assembly is returned to the rest station.

Thus, it can be seen that a highly advantageous apparatus can be had for focusing a laser beam to make a desired cutting through the metal shroud of a nuclear core fuel subassembly wherein a focus head assembly is guided along the shroud in a simple yet reliable manner by utilizing mechanical follower assemblies which automatically align the focal point of the laser beam in response to variations in the bow and twist of the shroud.

While a preferred embodiment of the invention has been described using specific terms, such description is for illustrative purposes only, and it is to be understood that changes and variations may be made without departing from the spirit or scope of the following claims.

What is claimed is:

1. Apparatus for cutting an outer shroud of an elongated core fuel subassembly and the like utilizing an associated laser beam, said apparatus comprising:
   a frame;
   means for supporting said core fuel subassembly beneath said frame;
   first carriage means carried by said frame for translatory movement in a longitudinal direction along said frame;
   a first turning mirror carried by said first carriage means for directing said laser beam in a vertical direction producing a generally vertical laser beam;
   a second carriage means carried by said first carriage means for translatory movement in a vertical direction;
   a second turning mirror carried by said second carriage means for receiving said vertical laser beam and directing said beam in a generally horizontal direction;
   a third carriage means carried by said second carriage means for translatory movement in a lateral direction transverse to said longitudinal direction;
   mirror means carried by said third carriage means for receiving said laser beam from said second turning mirror and focusing said beam at a focal point on said core fuel shroud; and
   means for guiding said second and third carriage means during cutting operations automatically moving said second and third carriage means in said vertical and lateral directions to maintain said focal point of said laser beam at the correct location for cutting.

2. The apparatus of claim 1 wherein said mirror means includes a third turning mirror for turning said horizontal beam from said second mirror vertically and a focusing mirror for focusing said vertical beam on said shroud.

3. The apparatus of claim 1 including a constant force spring assembly connected between said first carriage means and said second carriage means acting as a counterweight to the movement of said second carriage means.

4. The apparatus of claim 1 wherein said guide means includes a mechanical follower assembly for following the contour of said shroud transmitting forces exerted thereon due to said variations in contour to either of said second or third carriage means for moving said carriage means in the appropriate vertical or lateral direction to maintain said beam focused at the correct point for cutting.

5. The apparatus of claim 4 wherein said mechanical follower assembly includes a circumferential follower for following said shroud during circumferential cutting and a longitudinal follower for following of said shroud during longitudinal cutting.

6. The apparatus of claim 2 including means for aligning said third turning mirror and focusing mirror for proper focusing of said beam.

7. Apparatus for cutting an outer shroud of an elongated core fuel subassembly and the like utilizing an associated laser beam, said apparatus comprising:
   a frame,
   a first carriage means carried by said frame for movement in a longitudinal direction;
   a focus head assembly carried by said first carriage means, said focus head assembly being movably carried relative to said first carriage means;
   mirror means carried by said first carriage means and focus head assembly for transferring and focusing said laser beam at a point on said shroud; and
   a follower assembly carried by said focus head assembly for following the contour of said shroud during cutting and automatically adjusting the position of said focus head assembly in response to variations in said contour to maintain said beam focused at a correct point for cutting, said follower assembly including a circumferential follower assembly for following the circumference of said shroud during cutting, a longitudinal follower assembly for following the length of said shroud during cutting; and connector means connecting said circumferential and longitudinal follower assemblies for translating variations in said contour into movement of said focus head assembly.

8. The apparatus of claim 7 including a second carriage means movable in a vertical direction and a third carriage means movable in a lateral direction each included in said focus head assembly.

9. The apparatus of claim 8 wherein said second carriage means is carried for vertical movement on said first carriage means and said third carriage means is carried for lateral movement on said second carriage means.

10. The apparatus of claim 8 wherein said mirror means includes a first turning mirror carried by said first carriage means for turing said beam vertically, a second turning mirror carried by said second carriage means for turning said vertical beam horizontally, a third turning mirror carried by said third carriage means for redirecting said horizontal beam vertically; and a focus mirror carried by said third carriage means for focusing said redirected vertical beam upon said shroud.

11. The apparatus of claim 8 wherein said follower assembly includes means for selectively engaging either said circumferential or longitudinal follower into contact with said shroud, and connector means connecting said circumferential and longitudinal followers to said focus head assembly causing said second and third carriage means to move in response to forces exerted on said engaging follower during cutting operations to maintain the focal point of the beam at a correct location for cutting.

12. The apparatus of claim 11 wherein said connector means includes a mechanical arm connecting said circumferential and longitudinal follower, said arm being pivotably connected to said third carriage means.

13. Apparatus for cutting a shroud of an elongated core fuel subassembly and the like utilizing an associated laser beam, said appartus comprising:
means for supporting said core fuel subassembly;
a carriage carried adjacent said shroud for longitudinal movement relative thereto;
a focus assembly movably carried by said carriage, said focus assembly including a second carriage carried by said first mentioned carriage for relative vertical movement and a third carriage carried by said second carriage for relative lateral movement;
mirror means carried by said first mentioned carriage and focus head assembly for transferring and focusing said beam upon said shroud at a correct location for cutting;
guide means for moving said focus assembly in response to tracking the contour of said shroud to maintain said beam focused at said correct location; and
a mechanical follower assembly included in said guide means having a longitudinal follower for engaging and following the longitudinal contour of said shroud, said longitudinal follower being mechanically connected to said focus assembly to automatically adjust the position of said focus assembly laterally with respect to said longitudinal dimension of said shroud.

14. The apparatus of claim 13 wherein said mechanical follower assembly carried by said focus assembly includes a circumferential follower for tracking said shroud during circumferential cutting and guiding said focus assembly accordingly.

15. The apparatus of claim 14 wherein said circumferential and longitudinal followers are connected by means of a connector arm pivotably carried at a pivot point by said third carriage whereby forces exerted on either of said followers during tracking are transmitted to the focus assembly at said pivot to move said carriages and automatically maintain said beam focused at said correct location.

16. The apparatus of claim 14 wherein said circumferential follower includes a pair of spaced rollers for engaging the circumference of said shroud at circumferentially spaced points.

17. The apparatus of claim 13 wherein said longitudinal follower includes a pair of roller assemblies for engaging said shroud at diametrically opposed points and traversing the length thereof, said roller assemblies being biased toward said shroud.

* * * * *